July 23, 1957     J. F. NIGGELER     2,800,107
FEEDER PAIL NIPPLE STRUCTURE
Filed Jan. 18, 1954

INVENTOR.
JACOB F. NIGGELER
BY
ATTORNEYS

United States Patent Office

2,800,107
Patented July 23, 1957

2,800,107

FEEDER PAIL NIPPLE STRUCTURE

Jacob F. Niggeler, Robbinsdale, Minn., assignor to General Metalware Company, Minneapolis, Minn., a corporation of Delaware Application January 18, 1954, Serial No. 404,484

9 Claims. (Cl. 119—71)

This invention relates to improvements in feeder pail nipples of the detachable fixture type adapted to be inserted in the wall of a pail or container having a side wall and a bottom wall and from which milk or other liquid food is drawn by calves or other suckling animals.

The nipple structures or teats heretofore used with feeder pails have offered certain defects in that they have required multiple parts in order that they might be secured. Thus, it has heretofore been necessary to provide a separate gasket for making a liquid tight junction with the pail. According to this invention the nipple, which is of resilient material, is constructed so as to afford this purpose in addition to its primary purpose as a nipple.

The calf or other animal in nursing uses a compound sucking action which not only provides suction but also compression by which milk is actually forced from the teat. This action is frequently quite vigorous and the nipple must be securely attached. This action often is sufficient in intensity to loosen any nipple structure which is not thoroughly secured to the pail. It is therefore not only necessary to have a nipple which may be readily detached but also one which may be very effectively attached in secure relation and in addition, it should be possible to do this without tools.

It is important that the nipple structures or teats should be capable of being disassembled with ease, so as to allow easy cleaning after each feeding in order to insure the sanitation necessary for healthy animals.

It is therefore an object of my invention to provide a new and useful nipple structure for suckling animals of the type adapted to be inserted in the side wall and adjacent the bottom wall of a container constructed so as to draw the milk or other liquid off the bottom of the container and yet so made as to be capable of easy disassembly and yet which may be securely reassembled in position without tools.

Another object of this invention is to provide a flexible nipple structure or teat which may be readily attached to a feeder pail and which will without additional gaskets form a tight and leak-proof juncture with the pail.

Another object of this invention is to provide an attachment for securing a flexible nipple to a feeder pail having few and readily separable parts to facilitate removal from the pail and replacement thereof.

Another object of this invention is to provide a feeder pail nipple structure which may be disassembled into components for the positioning to and removal from a feeder pail.

It is still a further object of this invention to provide a feeder pail nipple structure having a component which may be positioned adjacent the bottom of a walled container and which will not turn as a second threaded component is threaded thereinto.

Still another object of this invention is the provision of a feeder pail nipple structure in which the resilient material of the nipple itself is utilized to provide a seal with the feeder pail.

Other objects of this invention reside in the structure of the chambered cap nut for my feeder pail nipple structure having an interrupted threading which provides an opening extending generally toward the bottom of the pail and with depending lugs on the cap nut, extending to a position closely adjacent the bottom of the pail for engaging said bottom and holding the cap nut from turning.

Still other objects of this invention reside in the provision of a cooperating ferrule and resilient nipple having a securing flange so shaped that the flange of the nipple not only secures the nipple but seats directly against and forms a seal with the pail to prevent loss of fluid, thus dispensing with a separate sealing washer.

Still further objects of this invention reside in the cooperation of the ball check valve with the nipple and in the cooperative structure of the nipple, ball check valve, ferrule and chambered cap nut.

Other and further objects of this invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings forming a part of this application in which corresponding numerals refer to the same parts and in which.

Figure 2:
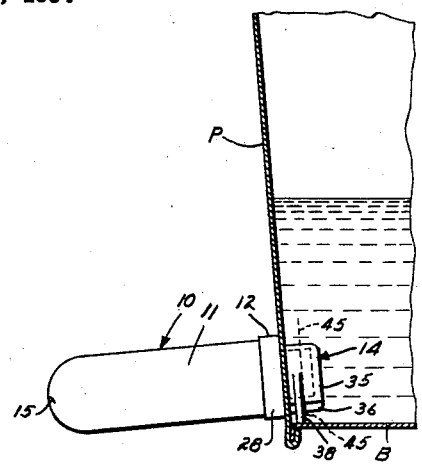
Figure 2 is an enlarged fragmentary sectional view through the pail, similar to Figure 1, showing in greater detail the manner of attachment of the nipple to the pail.
Figure 3:
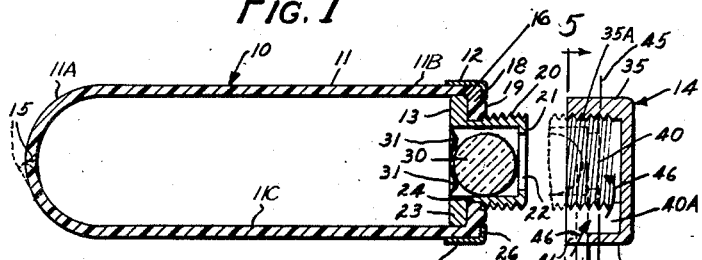
Figure 3 is a vertical sectional view of the nipple component of my invention showing the ball check valve therein.

Referring now to the drawings and specifically to Figures 2–5, my feeder pail nipple assembly comprises only five components; a flexible nipple 11 which is usually made of rubber, a ferrule 12, a ball check valve housing 13, a ball 30, and a cap nut generally designated 14. The nipple assembly 10 is composed of nipple 11, ferrule 12 and ball check valve housing 13 and ball 30, and as shown in Figure 3, this assembly is all on the outside of the pail except for a portion of the threads 20 which extend through a hole in the pail and are held by the cap nut 14.

The nipple element 11 is of resilient composition, commonly of rubber composition or other suitable material, The outer end is smooth and rounded, and has a crescent-shaped cut 15 through its outer or distal end 11A to form an aperture for the out-flow of milk or other liquid from the nipple when the calf or other animal is feeding therefrom. The slit closes when the calf is not sucking and the milk will therefore be retained except during the sucking action of the animal.

Figure 1:
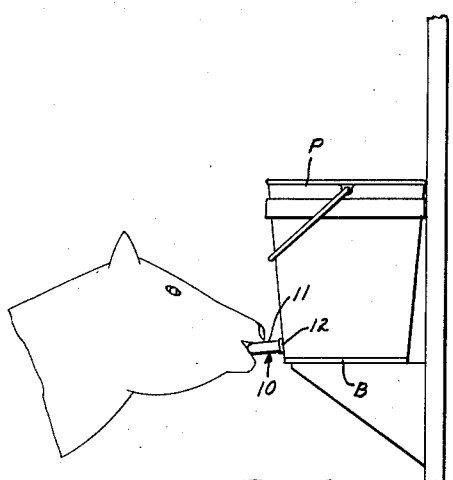
Figure 1 is a side elevational view of my nipple assembly attached to a feeder pail and showing a calf feeding therefrom.

In suckling from a feeder pail, the calf or other animal not only uses a sucking action but also a sort of compression action on the cylindrical wall or body 11C of the nipple by which the milk is actually placed under pressure. This causes the ball check valve to close and forces the milk from the flexible nipple. It is surmised that in feeding from a cow's teat, the calf first allows the teat to fill with milk and then squeezes it near the base, working the area of construction from the base toward the outer end to force the milk into his mouth, the initial pressure near the base and the squeezing motion serving to prevent the passage of milk back into the udder. Here, this back flow is prevented by the ball check valve. The conventional crescent slit 15 of my nipple assembly 10 provides a central flap adapted to swing outwardly to provide an aperture from the nipple 11, allowing the milk to squirt out as the nipple is compressed, the flap being effective to prevent leakage from the nipple when it is in the normal shape shown in Figures 1–3. The provision of the ball check valve 13 prevents the forcing of milk back into the pail as this sucking action ensues.

The cylindrical wall 16 of the nipple 11 at the inner or proximal end 11B thereof is of a thickness shown best with reference to Figure 3. The inner, or attachment end of the nipple is provided with an integral inturned flange 18 which has a radial width of 1¼–1½ times as much as the thickness of wall 16. Flange 18 is provided with a thickened annular beading or axially extending flange 19 extending from the nipple flange 18 toward the position of the pail wall as shown in Figure 3. Flange 19 extends in an axial direction enough, or about enough, to reach through the thickness of the metal of flange 26 on ferrule 12.

The ball check valve housing 13 is provided with a threaded end 20 which is just long enough to extend through the pail wall and into the inside of the pail so as to provide a few threads on which can be screwed nut 14. The ball check valve housing 13 also has an annular inturned flange 21 upon which the ball 30 seats and which provides an orifice or port 22. Valve housing 13 is also provided with an annular out-turned flange 23 which seats in the annular corner 16 formed by the wall of nipple 11 and the flange 18, all as shown in Figure 3. Flange 23 has an outside diameter slightly smaller than the inside diameter of cylindrical wall 16 of the nipple. Valve housing 13 is also provided with an annular recess 24 between flange 23 and the adjacent threads 20. The inner circumference of flange 18 on the rubber nipple is of a size such that it seats in this recess 24 with the axial extending flange 19 of the nipple extending out a little way over the crests of threads 20.

Ferrule 12 has a circular inturned edge 26 having an inside diameter large enough to allow annular flange 19 to extend therethrough and an annular flange 28 having an inside diameter just sufficient to receive the outside of cylindrical wall 16 of the nipple.

Figure 9:
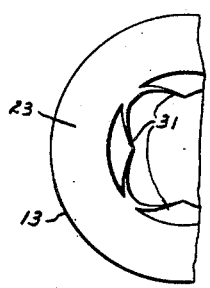
Figure 9 is an enlarged fragmentary top plan view taken in the direction of arrows 9—9 of Figure 8 showing the ball check valve housing of Figures 3, 7 and 8, and the incised retaining flanges.
Figure 8:
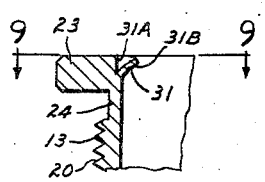
Figure 8 is a view similar to Figure 7 but showing a second step in the formation of one of the incised ball retaining flanges.

As shown in Figure 3, valve body 13 is hollow and a ball 30 of suitable material, usually glass, is positioned therein and free to move from engagement with the valve seat flange 21 to engagement with a plurality of incised retaining tips 31. Usually four such tips 31 are used and are provided by an incising operation on the valve housing B. A suitable die cuts the tips 31 and bends them inwardly to form the tips 31 as shown in Figures 8 and 9. The ball is small enough to allow the milk or other fluid to flow around it when it is unseated from port 22 at flange 21, but is held between the valve seat 21 and the tips 31.

Figure 7:
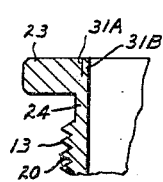
Figure 7 is a fragmentary vertical section of the ball check valve housing of Figure 3 showing one step in the formation of one of the incised ball retaining flanges.

Referring now specifically to Figures 7–9, it will be seen that the incised tips 31 are made by a forming die which makes arcuate cuts 31A into the body of valve housing 13. These cuts are then bent away from the wall of housing 13 to form tips 31B which keep ball 30 from coming out of the housing 13.

Figure 4:
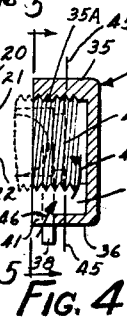
Figure 4 is a vertical sectional view of the chambered cap nut component of my invention.
Figure 5:
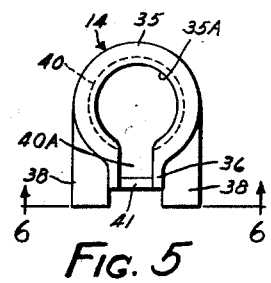
Figure 5 is an elevational view of the chambered cap nut of Figure 4 as viewed from the direction of arrows 5—5 of Figure 4.
Figure 6:
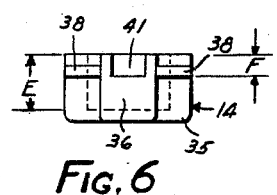
Figure 6 is a bottom plan view of the chambered cap nut of Figures 4 and 5 as viewed from the direction of arrows 6—6 of Figure 5.

The chambered cap nut 14 forms a lobate member, is of the configuration best shown in Figures 4–6 and comprises a body portion 35 with a lobe 36 extending from one side along one diameter. At either side of the lobe 36 and extending beyond it a little there are provided two depending lugs or feet 38, these feet being of a length such that when the nut 14 is in place, as in Figure 2, the feet 38 will be positioned to engage the bottom B of a pail P or at least be close enough to the bottom B so as to prevent the nut 14 from turning. The chambered cap nut 14, as shown in Figures 4 and 5 has an annular interior chamber 40 of depth E in the body 35 thereof. This chamber 40 has a side slot 40A communicating with it in the lobe 36. Body 35 is provided with threads 35A around the interior chamber 40, the threads being interrupted by the side slot 40A in lobe 36. The depth E of the chamber 40 of the body 35 is the same as in slot 40A but this depth is reduced to the dimensions F at notch 41. In Figure 4, the end 20–21 of the valve body 13 is shown in dotted lines and as will be observed, the flange 21 penetrates only to the position of line 45—45. Accordingly, when the nipple structure 10 is in the position of Figure 2, a passageway is provided, as shown by arrows 46, through the notch 41 and thence through the space 40A and 40 to the port 22, through which milk or other fluid from the interior of the pail may be drawn upwardly through the notch 41 in lobe 36 through the spaces 40A and 40 in body 35, and thence through the opening 22 in the threaded end 20 of valve body 13, and thence through the hollow interior of the valve body 13, past the ball 30 and into the interior of nipple 11 and thence through flap 15 to the mouth of the suckling animal.

To position the assembly 10 as shown in Figure 2, the cap nut 14 is merely held inside the pail with its feet 38 down towards the bottom B of the pail P as shown in that figure. The feet 38 will prevent the cap nut from being turned as the threaded end 20 is turned into the nut 14. The valve body 13 and ferrule 12 and nipple 11 are previously assembled as unit 10, as shown in Figure 3. Then the threaded end 20 is inserted through the aperture in the pail and screwed into the interior threads 40 of cap nut 14. This is done by grasping the cylindrical wall 16 and turning the entire teat assembly 11—13 into cap nut 14 until the ferrule 18 and the extending flange 19 are brought into engagement with the outer surface of the vertical wall of the pail whereupon flange 19 will be compressed to provide a seal against the wall of the pail. As the nipple assembly 11—12—13 is screwed tight, the pressure of the wall of the pail against the adjacent surface 26 of ferrule 12 compresses the rubber flange 18 and causes it in effect to bulge the flange 19 in a direction outwardly beyond the ferrule surface 26 and hence the flange 19 of rubber is brought tightly against the pail. The assembly captures the flanges 18—19 and compresses them against the pail wall. The assembly is very easily accomplished by thus merely holding the nut 14 in the appropriate position as described and turning the threaded end 20 into it from the outside of the pail.

To disassemble the unit from the pail, the assembly 11—13 is turned in the opposite directions to unscrew the threads. As will be appreciated from the illustration in Figure 3, after the nipple 11, ferrule 12, and valve 13 are disassociated from the cap nut 14, the ferrule 12 may be pulled free from its engagement with the wall 16 of nipple 11 and the valve body 13 may be pulled loose from body 13 due to the resiliency of the rubber flange 18. The nipple 11 can then be cleaned thoroughly inside and out, as may the ferrule 12 and the valve body 13, whereupon they may be reassembled in cooperation as shown in Figure 3.

The nipple assembly of the present invention is novel in that the extrusion of the flange 19 during the screwing home of assembly 11—12—13 into cap nut 14 enables the flange 19 to seat against the exterior curved surface of the ordinary 12-quart galvanized pail ordinarily used, thus making it wholly unnecessary to provide any special "flat" surface around the hole in the pail wall through which the threaded end 20 is placed. Hence, an ordinary hole punched in the curved pail wall will suffice and irregularities due to the non-planar (curved) pail wall are of no consequence, since sealing is nevertheless effected due to the compressive extrusion of the flange 19 against the wall. Likewise, slight manufacturing irregularities such as roughness in galvanizing are not a disadvantage and do not cause loss of the effective seal which can be easily accomplished by even the inexperienced user.

When the cap nut 14 is detached it is entirely open and may easily be cleaned. There is no interior passageway and it can simply be flushed with water and detergents to clean it.

It will be obvious to those skilled in the art that the threads 20 may be replaced by other forms of detachable connections such as a bayonet connection.

As many apparently widely differing embodiments of this invention may be made without departing from the spirit and scope thereof, it is to be understood that I do not limit myself to the specific embodiments disclosed herein.

What I claim is:

1. A feeder pail nipple structure comprising in combination a teat assembly having a hollow member shaped at one end thereof to extend through a pail wall, a chambered cap nut, said member and cap nut being formed so as to engage each other and become attached against displacement, said cap nut comprising a housing and said housing having portions extending therefrom for engagement with the pail bottom for holding it against rotation.

2. The apparatus of claim 1 further characterized by said housing comprising a lobate structure having a channel in the lobe thereof, and feed means extending beyond said lobe for engaging the pail bottom.

3. A feeder pail nipple structure comprising a combination a resilient nipple having a cylindrical wall and an inturned annular flange at one end thereof, a hollow member positioned on the interior of said nipple and having a flange in cooperation with said annular flange of said nipple, a cap nut detachably securable to said hollow member comprising a housing having an extending portion thereon for engaging the bottom of a feeder pail for holding said cap nut against rotation.

4. A feeder pail nipple structure comprising in combination a resilient nipple having a proximal end and a distal end, an aperture in said distal end for allowing fluid to be withdrawn therefrom in response to sucking by an animal, a cylindrical wall joining said proximal end and said distal end, an inturned annular flange at said proximal end, a ferrule comprising a horizontal flange and an inturned flange positioned to engage the shoulder formed by the juncture of said cylindrical wall with said inturned flange, the edge of said inturned flange of said ferrule being spaced away from the edge of said inturned annular flange of said cylindrical wall and said inturned flange of said cylindrical wall having an extending bead of a thickness slightly greater than the thickness of said vertical flange of said ferrule, and extending therebeyond, threaded means secured to said proximal end of said nipple and a chambered cap member positioned thereon.

5. A feeder pail nipple structure comprising in combination a resilient nipple having a proximal end and a distal end, means at said distal end for permitting the egress of fluid therefrom in response to sucking manipulation thereof, a cylindrical wall joining said distal end and said proximal end, an inturned annular flange at substantially right angles to said cylindrical wall at said proximal end, a ferrule comprising a horizontal flange and a vertical integral flange positioned to engage the shoulder formed by the juncture of said cylindrical wall with said inturned end, the edge of the vertical flange of said ferrule being spaced away from the edge of said inturned flange and said inturned flange having an extending bead of a thickness greater than the thickness of said vertical flange of said ferrule and extending therebeyond, and threaded retaining means for retaining said nipple structure on a pail.

6. A feeder pail nippple structure comprising in combintion a resilient nipple having a proximal end and a distal end, means at said distal end for permitting the egress of fluid therefrom in response to sucking manipulation thereof, a cylindrical wall joining said proximal end and said distal end, an inturned annular flange at substantially right angles to said cylindrical wall at said proximal end, a ferrule comprising a horizontal flange and a vertical integral flange positioned to engage the shoulder formed by the juncture of said cylindrical wall with said inturned flange, a hollow annular ball check valve of T cross-section having the stem of the T engaging the interior surface of said inturned flange, the edge of the vertical flange of said ferrule being spaced away from the stem of said valve, said inturned flange of said nipple having an extending bead of a thickness greater than the thickness of said vertical flange of said ferrule and extending therebeyond, the stem of said valve being hollow and provided with a retaining means at each end thereof and a ball member adapted to reciprocate between said retaining means, and a cap nut comprising a lobate member having a depending lobe removably positioned on said valve stem.

7. A feeder pail nipple structure comprising in combination a resilient nipple having a proximal end and a distal end, means at said distal end for permitting the egress of fluid therefrom in response to sucking manipulation thereof, a cylindrical wall joining said proximal end and said distal end, an inturned annular flange at substantially right angles to said cylindrical wall at said proximal end, a ferrule comprising a horizontal flange and a vertical integral flange positioned to engage the shoulder formed by the juncture of said cylindrical wall with said inturned flange, a hollow annular ball check valve of T cross-section having the stem of the T engaging the interior surface of said inturned flange, the edge of the vertical flange of said ferrule being spaced away from the stem of said valve, said inturned flange of said nipple having an extending bead of a thickness greater than the thickness of said vertical flange of said ferrule and extending therebeyond, the stem of said valve being hollow and provided with a retaining means at each end thereof and a ball member adapted to reciprocate between said retaining means, and a cap nut comprising a lobate member having a depending lobe removably positioned on said valve stem, a pair of spaced depending members positioned adjacent and extending beyond said lobe, said cap being threaded on the interior thereof and said threads being interrupted at said lobe to form a port therethrough and said cap being threaded on said threaded stem of said check valve.

8. In combination, a resilient nipple having a proximal end and a distal end, an aperture in said distal end for allowing fluid to be withdrawn therefrom in response to sucking by an animal, a body portion joining said proximal end and said distal end, said nipple being hollow and provided with an inturned annular flange at said proximal end, a valve housing having an out-turned annular flange seated interior of said nipple at said proximal end and having a threaded portion extending therefrom and nut means threaded thereon for securing said nipple structure to a pail.

9. The structure of claim 8 further characterized in that said nut means comprises a chambered cap member having a pair of spaced lugs extending therefrom, and a channel to the interior of said housing positioned therebetween.

References Cited in the file of this patent
UNITED STATES PATENTS

| | | |
|---|---|---|
| 1,525,314 | Mullen | Feb. 3, 1925 |
| 1,630,982 | Stone | May 31, 1927 |
| 2,143,719 | Schulte | Jan. 10, 1939 |
| 2,535,158 | Rhinehart | Dec. 26, 1950 |
| 2,535,159 | Rhinehart | Dec. 26, 1950 |
| 2,613,642 | Hiller | Oct. 14, 1952 |
| 2,672,124 | McCrary | Mar. 16, 1954 |
| 2,714,368 | Voigt et al. | Aug. 2, 1955 |